INVENTOR.
WILLIAM J. O'BRIEN
BY
ATTORNEY

Oct. 4, 1949.                 W. J. O'BRIEN                    2,483,557
                            RADIO BEACON SYSTEM
Filed Aug. 27, 1945                                         3 Sheets—Sheet 3

INVENTOR
WILLIAM J. O'BRIEN
BY
ATTORNEY

Patented Oct. 4, 1949

2,483,557

UNITED STATES PATENT OFFICE 2,483,557

RADIO BEACON SYSTEM

William J. O'Brien, London, England, assignor to The Decca Record Company, Limited, London, England, a corporation of Great Britain Application August 27, 1945, Serial No. 612,996

4 Claims. (Cl. 343—105)

My invention relates to a radio beacon system of the equi-phase displacement type and has particular reference to a novel radio beacon transmitting and receiving apparatus which reduces to a minimum the course indication errors resulting from phase shifts within the receiving apparatus.

In my copending application Serial No. 420,059, filed November 22, 1941, and entitled "Radio beacon system," now abandoned, I have disclosed and claimed a radio beacon navigational system of the equi-phase displacement type in which two spaced transmitters are operated at different but harmonically related frequencies and at a fixed multiple phase relation with respect to each other. These signals are received by a mobile receiver mounted within the vehicle employing the navigational aids afforded by the system. Within the receiver the received signals are brought to a common comparison frequency and the phase relation between the resulting potentials are measured and indicated continuously to apprise the operator of the vehicle of his direction of travel with respect to a predetermined compass course.

In the apparatus just briefly described considerable care must be exercised in the design, adjustment and operation of the receiving equipment to prevent additional phase shifts within the two receiving channels from providing an erroneous indication as to the location of the vehicle with respect to its noted course. For this reason there is included in the apparatus disclosed in the aforementioned application a phase displacement standard or reference signal which may at any time be switched into the receiver input to provide a ready check upon the operation of the receiver.

The present invention is directed to overcoming these phase shift difficulties by providing a receiving apparatus in which the reference signals are used continuously as a standard against which the phase of the received signals are compared for indicating the location of the vehicle relative to the desired course. Another embodiment of the invention described herein is an alternative system in which the reference signals are applied to the same two transmitters as are employed for establishing the equi-phase displacement pattern utilised by the system.

It is accordingly an object of my invention to provide a radio beacon system of the equi-phase displacement type which overcomes the above noted disadvantages by making the required phase comparison on the basis of a low frequency in or near the audible range.

It is also an object of my invention to provide a novel receiving apparatus for use with a radio beacon transmitting apparatus of the character disclosed in my aforementioned copending application and which employs a signal generator producing a fixed phase displacement standard as a reference against which all phase displacement comparisons are made.

It is additionally an object of my invention to provide a radio beacon system of the character set forth in the preceding paragraphs in which the reference signals employed as a standard of phase comparison are transmitted to the mobile receiver by means of the same transmitting apparatus as is employed to establish the equi-phase displacement field pattern.

Other objects and advantages of my invention will be apparent from a study of the following specifications read in connection with the accompanying drawings, wherein:

Fig. 3 is a field pattern diagram illustrating by means of lines representative of equi-phase displacement contours the nature of the field pattern produced by a beacon transmitting apparatus operating in accordance with an alternative embodiment of my invention;

Figure 1:
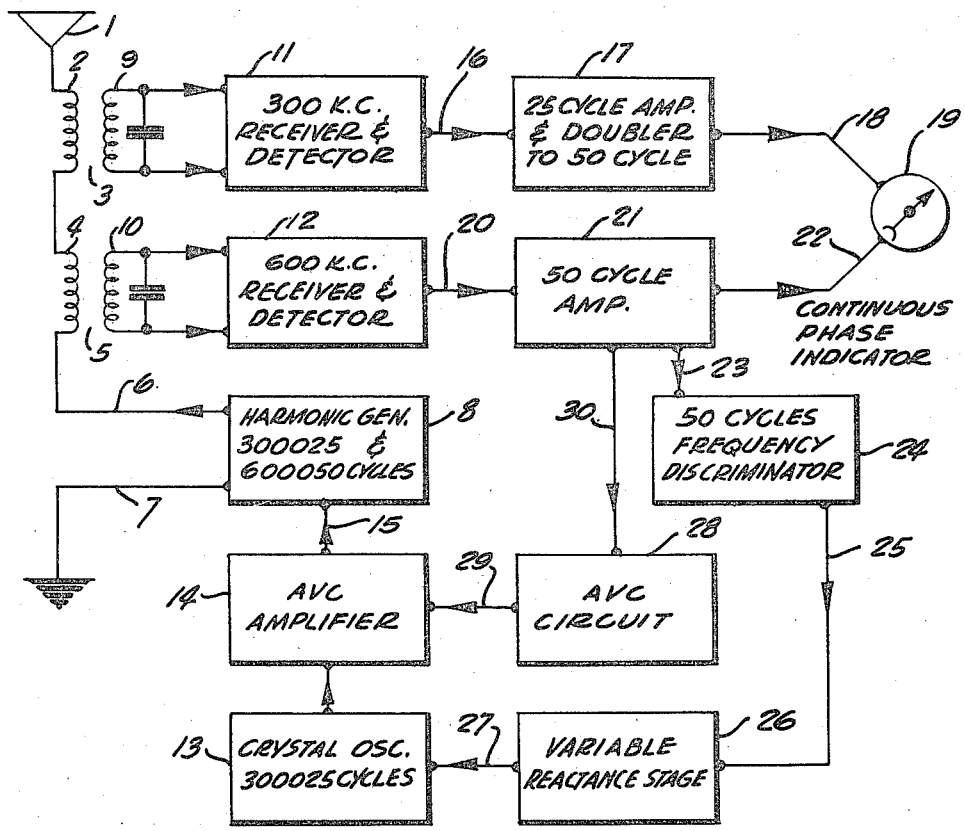
Fig. 1 is a block diagram disclosing the apparatus employed in a novel receiving apparatus for use with radio beacon system of the equi-phase displacement type.
Figure 4:
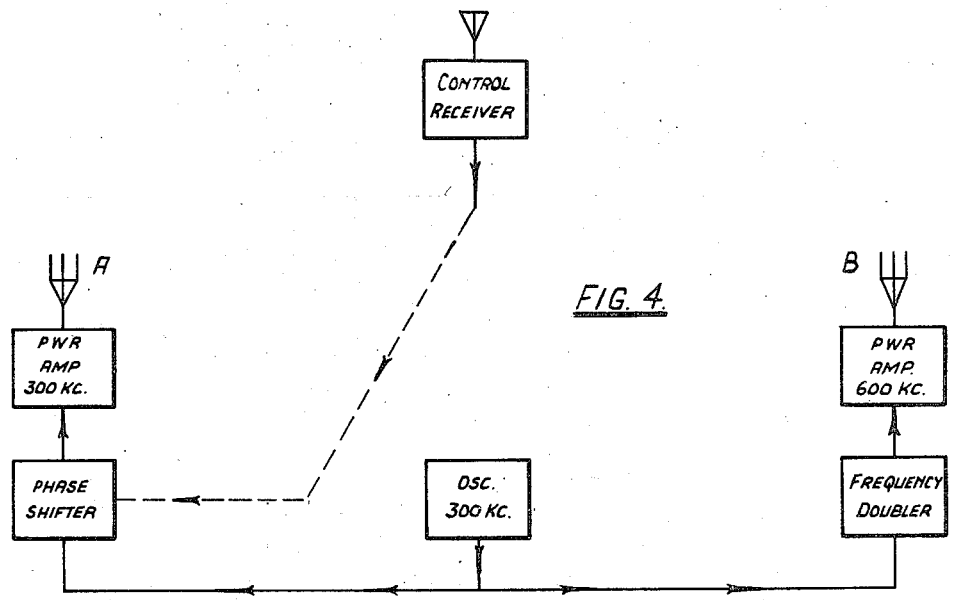
Fig. 4 is a block diagram representing the transmitting apparatus which may be used for an equi-phase displacement type of radio beacon system.

As before stated, the radio beacon system which is disclosed in my aforementioned copending application employs two radio frequency transmitters operating on different but harmonically related frequencies and with a fixed multiple phase relation between the transmitted signals to establish an equi-phase displacement field pattern. Such a transmitting apparatus is illustrated in Fig. 4 as comprising a suitable source of radio frequency energy such as an oscillator. For the purposes of illustration it will be assumed that the transmitting apparatus operates to transmit signals having frequencies of 300 and 600 kilocycles. The oscillator, therefore, may be arranged to generate a 300 kilocycle signal which is divided, one part being passed through a frequency doubler and a 600 kilocycle power amplifier to excite antenna B, while the other part is passed through a phase shifting apparatus and a 300 kilocycle power amplifier which excites antenna A. The phase shifter is coupled by a control connection represented by the dotted line in Fig. 4 to a control receiver. The control receiver may be a receiving apparatus such as that which is described hereinafter and is placed at a location where the multiple phase relation between the 300 and 600 kilocycle signals should have a known predetermined relation. Departures from this known relation are detected by the receiver and the output of the receiver is used to control the phase shifter in such a way as to restore the phase relation at the receiver to the desired value. In Fig. 1 I have illustrated a receiving apparatus which may be used in connection with a beacon transmitting apparatus of the character described. The receiving apparatus illustrated in Fig. 1 includes an antenna 1 which is connected in a series circuit with a primary winding 2 of a coupling transformer 3, a primary winding 4 of a second coupling transformer 5, and by means of conductors 6 and 7 with the output circuit of a harmonic generator 8. The transformers 3 and 5 respectively include secondary windings 9 and 10. These windings are coupled to the input circuits of a 300 kilocycle radio frequency receiver 11 and a 600 kilocycle radio frequency receiver 12, the transformer windings 9 and 10 being also tuned respectively to these frequencies.

The harmonic generator 8 is driven by a crystal oscillator 13 which is preferably adjusted to normally produce an output frequency of 300.025 kilocycles. This output is amplified by an automatic volume control amplifier 14, the output of which is coupled as indicated at 15 to drive the harmonic generator 8. The harmonic generator 8 may comprise a distorter stage such as a class C amplifier, and operates to produce an output signal which is rich in harmonics bearing a fixed and unchanging multiple phase relation with respect to each other. The output circuit of the harmonic generator 8 is adjusted to apply to the antenna circuit the fundamental and second harmonic of the oscillator frequency so that in addition to the 300 kilocycle and 600 kilocycle signals picked up by the antenna 1 there will also be impressed upon the transformer primary windings 2 and 4 signals having frequencies of 300.025 kilocycles and 600.050 kilocyles. By reason of the tuning of the secondary windings 9 and 10 the 300.025 kilocycle signal will be impressed across the input of the amplifier 11 along with the 300 kilocycle signal picked up by the antenna 1. Similarly the 600.050 kilocycle signal will be impressed across the input of the receiver 12 along with the 600 kilocycle signal picked up by the antenna 1.

Each of the receivers 11 and 12 include detector circuits operating to develop across their output terminals alternating potentials having frequencies equal to the heterodyne of the two frequencies applied to the input circuits of the receivers. Accordingly, the receiver 11 develops across its output terminals a 25 cycle signal, whereas the signal developed across the output terminals of the receiver 12 is a 50 cycle signal. The receiver 11 is coupled as indicated at 16 to a 25 cycle amplifier and frequency doubler 17 operating to produce at its output a relatively high level signal having frequency of 50 cycles. This signal is applied as indicated at 18 to one input circuit of a continuous phase indicator 19. The phase indicator 19 may comprise an instrument of any type suitable for indicating the phase angle between two 50 cycle potentials. A preference is expressed for either the indicating apparatus which is disclosed in my copending application Serial No. 612,991, filed August 27, 1945, and entitled Multiple channel radio frequency receiver, or that disclosed in my copending application Serial No. 612,995, filed August 27, 1945, and entitled Radio beacon system, now abandoned.

In a similar arrangement, the output of the receiver 12 is coupled as indicated at 20 to the input of a 50 cycle amplifier 21 which operates to develop across its output terminals a relatively high level 50 cycle signal. This signal is applied as indicated at 22 to the other input circuit of the continuous phase indicator 19.

The operation of the apparatus thus far described is as follows:

The multiple phase relation between the 600 and 300 kilocycle signals applied to the input circuits of the receivers 11 and 12 is a function only of the geographical location of the mobile receiver with respect to the transmitting antenna. The multiple phase relation between the 300.025 kilocycle and the 600.050 kilocycle signals is fixed and unchanging because the harmonic generator 8 operates to produce signals which are characterized by fixed and unchanging multiple phase relation. The multiple phase relation between the two heterodyne frequencies (25 cycles and 50 cycles respectively) is, therefore, dependent only upon the multiple phase relation between the 600 kilocycle and the 300 kilocycle signals and, therefore, also dependent solely upon the geographical location of the vehicle with respect to the transmitting apparatus.

The amplifiers and doubler 21 and 17 operate to bring the heterodyne frequencies to equality for comparison purposes at a frequency of 50 cycles per second. The phase relation between these signals is indicated by the phase indicator 19 and is, therefore, truly representative of the geographical location of the vehicle relative to the transmitting apparatus. Furthermore, since the phase relationships between the heterodyne frequencies are established in the antenna circuit phase shifts in the high frequency signals passed by the receivers 11 and 12 do not in any way affect the accuracy of the indication given by the phase indicator 19.

In order that the apparatus may operate reliably it is desirable to maintain the reference signal frequencies of 300.025 kilocycle and 600.050 kilocycle very closely to the chosen frequencies so that the 50 cycle signals which are applied to the phase indicator 19 will suffer no change in frequency. This may be accomplished by applying one of the 50 cycle output signals, as, for example, in the manner indicated at 23 to a 50 cycle frequency discriminating circuit 24 operating to produce in its output circuit 25 a direct potential which is representative of the difference between the frequency applied to the input circuit and the fixed frequency standard. Ordinarily a suitable tuned circuit resonated at 50 cycles would be used as a standard for frequency comparison.

The direct potential output may be coupled as indicated by the output circuit 25 to a variable reactance stage 26 coupled as indicated at 27 to the oscillator 13 so as to vary the tuning of the crystal circuit to shift the frequency of the crystal control unit a few cycles per second one way or another as may be required to maintain the 50 cycle frequency at the circuits 18 and 22. The variable reactance stage 26 may be of any suitable type.

Furthermore, since the receivers 11 and 12 would ordinarily be provided with automatic volume control circuits to maintain a constant and adequate output level in spite of changing signal strength at the antenna 1 it is necessary to cause a corresponding variation in the output level of the harmonic generator 8 in order that a substantially constant amplitude 50 cycle signal may be applied to the phase indicator 19. I have illustrated in Fig. 1 suitable control apparatus for so regulating the output of the harmonic generator 8. Such apparatus includes an automatic volume control circuit of conventional type indicated by the rectangle bearing the reference character 28 coupled as indicated at 29 to control the gain of the automatic volume control amplifier 14. The control potential for the A. V. C. circuit is derived as indicated at 30 from the 50 cycle amplifier 21 and the circuit constants are so adjusted as to maintain a substantially constant 50 cycle output from amplifier 21 regardless of variations in signal strength picked up by the antenna 1.

Figure 2:
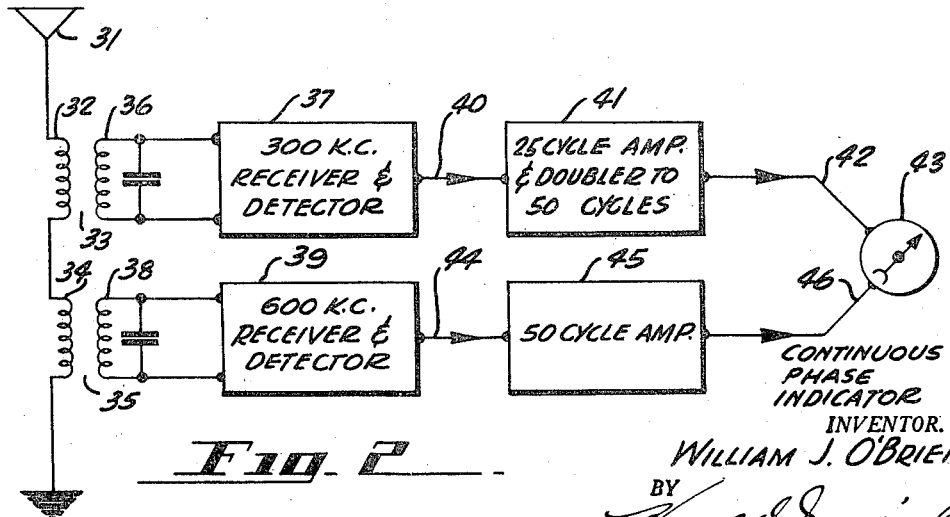
Fig. 2 is a drawing similar to Fig. 1 but illustrating a receiving apparatus which may be used with a modified form of the system.
Figure 2:
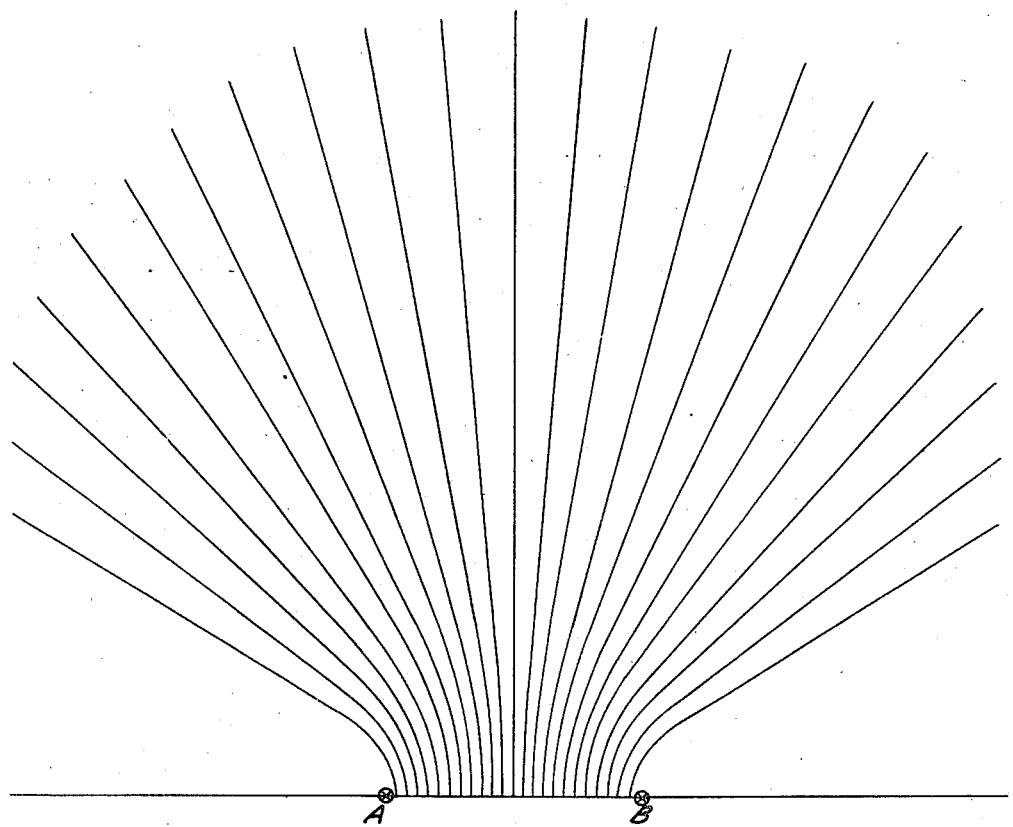
Figure 5:
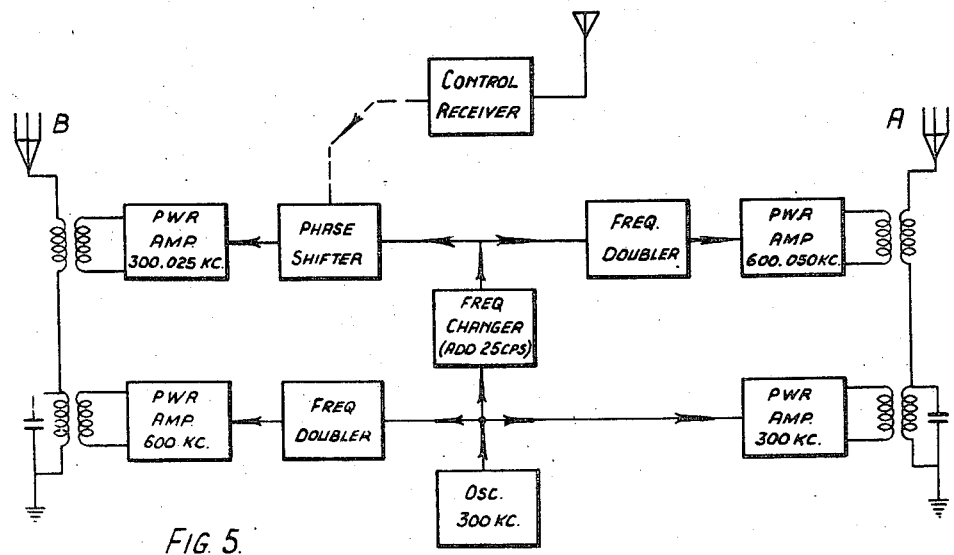
Fig. 5 is a block diagram illustrating the transmitting apparatus for a modified form of beacon system.

In Figs. 2, 3 and 5 I have disclosed an alternative arrangement in which the reference signal for phase comparison is transmitted from the same two antennae as are used to establish the equi-phase displacement field pattern, instead of being generated at the location of the mobile receiver as in the previously described modification. According to this modification two transmitters A and B (Fig. 3) are spaced apart a predetermined distance and energised at different but harmonically related frequencies in accordance with the disclosure in my aforementioned copending application Serial No. 420,059. In accordance with the assumed operating conditions the transmitters A and B will be spaced apart three wave lengths at the 300 kilocycle frequency as shown in Fig. 3, and energised respectively at 300 and 600 kilocycles. Also, suitable transmitting equipment is provided for supplying to antenna A a 600.050 kilocycle signal and for supplying to antenna B a 300.025 kilocycle signal. The transmitting apparatus may take the form represented by the block diagram of Fig. 5. A 300 kilocycle oscillator is employed which feeds antenna A through a 300 kilocycle power amplifier and which also feeds antenna B through a frequency doubler and a 600 kilocycle power amplifier. The 300 kilocycle output from the oscillator is also applied to the input of a frequency changer operating to add 25 cycles per second to the input frequency so as to produce an output frequency of 300.025 kilocycles. The frequency changer may be of any suitable type but conveniently takes the form of a goniometer, the stationary coils of which are supplied with 300 kilocycle energy in such a way as to establish a 300 kilocycle rotating field. The rotating coil is rotated in a direction counter to the direction of rotation of the rotating field and at the 25 cycle speed so as to induce in the rotating winding a 300.025 kilocycle signal. This signal is applied to antenna B through a phase shifter and through a 300.025 kilocycle amplifier. The 300.025 kilocycle output from the frequency changer is also passed through a frequency doubler and through a 600.050 kilocycle power amplifier coupled to antenna A. For phase control I employ a control receiver which may be of the character described hereinafter with reference to Fig. 2, and which is connected by means of a control connection represented by the dotted line in Fig. 5 to the phase shifter. The control receiver and phase shifter operate to shift the phase of the 300.025 kilocycle signals in such direction and by such amount as is required to restore the navigation pattern to its desired orientation. The equi-phase field pattern produced is of the character illustrated in Fig. 3. Attention is called to the fact that by reason of the transmission of dual frequencies from each of the two antennae twice the normal indication sensitivity is obtained. This is because a deviation of the guided vehicle from a given course will cause a change in one direction in the multiple phase relation between the 600 and 300 kilocycle signal and will, at the same time, cause a change in the opposite direction in the multiple phase relation between the 300.025 and 600.050 kilocycle signals.

In Fig. 2 I have illustrated receiving apparatus suitable for use with a transmission arrangement of the character just described. This apparatus includes a receiving antenna 31 coupled in a series circuit including a primary winding 32 of a coupling transformer 33 and a primary winding 34 of a coupling transformer 35. The coupling transformer 33 includes a secondary winding 36 tuned to 300 kilocycles and connected to the input of a 300 kilocycle radio frequency receiver 37. Similarly, the coupling transformer 35 includes a secondary winding 38 which is tuned to 600 kilocycles and connected to the input of a 600 kilocycle radio frequency receiver 39.

Each of the receivers 37 and 39 includes rectifying or detecting circuits operating to develop across the receiver output terminals alternating potentials having the same frequency as the heterodyne between the two frequencies applied to the input circuits of the receivers. Thus receiver 37 develops across its output terminals a 25 cycle signal resulting from the heterodyne of the 300 kilocycle signal radiated from antenna A with the 300.025 kilocycle signal radiated from antenna B. In like manner there appears across the output terminals of the receiver 39 a 50 cycle signal resulting from heterodyning the 600 kilocycle signal radiated from antenna B with the 600.050 kilocycle signal radiated from antenna A.

Receiver 37 is coupled as indicated at 40 to a 25 cycle amplifier and frequency doubler 41 operating to produce an output potential having a frequency of 50 cycles. This output is applied as indicated at 42 to one input circuit of continuous phase indicator 43. The phase indicator 43 may be identical with the indicator 19 previously discussed. The output of receiver 39 is coupled as indicated at 44 to the input of a 50 cycle amplifier 45, the output of which is connected as indicated at 46 to the other input circuit of the phase indicator 43.

As in the previously described modification of my invention, the multiple phase relation between the 25 cycle and 50 cycle heterodyne frequencies is determined entirely by the geographical location of the mobile receiver and is almost entirely independent of phase shifts in the 300 kilocycle and 600 kilocycle signals as those signals are passed through the receiving apparatus. The indication given by the form of the invention just described is the same as that given by the first described modification.

Attention is directed particularly to the fact that with the apparatus herein described the equi-phase field pattern is developed by radio frequency radiations of relatively high frequencies providing great sensitivity as regards course indication without requiring the transmitting antennae to be separated by great distances. At the same time the phase comparison is made on the basis of a very low frequency having a wavelength of the order of magnitude of three or four thousand miles, so that phase shifts introduced by the receiving apparatus into the high frequency signals introduces substantially no error in the indication given by the phase comparison between the low frequency signals. It will be noted that in the first described modification of my invention the fixed phase standard used as a basis for making the phase comparison is included as a part of the mobile receiving apparatus, whereas in the other modification the reference signals are transmitted to the mobile receiver by means of the same antennae as are used to establish the equi-phase displacement field pattern.

While I have shown and described the preferred embodiment of my invention I do not desire to be limited to the details of construction shown and described herein except as defined in the appended claims.

I claim:

1. In a mobile receiving apparatus for use with a radio beacon system of the type generating an equi-phase displacement field pattern by means of radio frequency radiations at two harmonically related frequencies bearing a fixed multiple phase relation to each other, the combination of: a pair of fixed frequency radio receivers resonated respectively to said two related frequencies for receiving said radiations; means for applying to said receivers reference signals differing slightly in frequency from said two related frequencies, said signals being also harmonically related and having a fixed multiple phase relation; rectifying means for each of said receivers for producing harmonically related output potentials having frequencies equal to the difference in frequency between said radiations and the corresponding reference signals; frequency converting means for converting said potentials to equal frequencies; and a continuously operating phase indicator for measuring and indicating the phase relation between said equal frequencies.

2. In a radio beacon system, the combination of: means at spaced points for radiating radio frequency energy at two different but harmonically related frequencies bearing a fixed multiple phase relation to each other; mobile fixed frequency receiving means for separately receiving said energy; means at said receiving means for adding to said received energy harmonically related radio frequency signals differing slightly in frequency from said two frequencies and bearing a fixed multiple phase relation to each other; means for rectifying the outputs from said receiving means; and means for measuring and continuously indicating the phase relation between the outputs of said rectifying means.

3. The method of determining at a given location the multiple phase relation between two radio frequency radiations from spaced points at different but harmonically related frequencies bearing a fixed multiple phase relation to each other, which consists in receiving at said location said two radiations, adding to each radiation a different one of a pair of reference signals differing by less than one percent in frequency from the corresponding radiation but bearing the same harmonic relation to each other as said radiations and having a fixed multiple phase relation to each other, and then measuring the multiple phase relation between the two low frequencies resulting from heterodyning each of said signals with the corresponding radiation.

4. The method of guiding the navigation of a mobile vehicle which consists in radiating from spaced points radio frequency energy at two different frequencies bearing a given harmonic relation to each other and having a fixed multiple phase relation, separately receiving said radiations at said vehicle, adding to said radiations reference signals having said given harmonic relation and a fixed multiple phase relation but each differing by less than one percent in frequency from the frequency of the corresponding radiation, and determining the multiple phase relation at the location of said said vehicle between the heterodyne frequencies of each of said signals with the corresponding radiation.

WILLIAM J. O'BRIEN.

REFERENCES CITED

The following references are of record in the file of this patent:

UNITED STATES PATENTS

| Number | Name | Date |
|---|---|---|
| 1,942,262 | Shanklin | Jan. 2, 1934 |
| 2,144,203 | Shanklin | Jan. 17, 1939 |
| 2,148,267 | Honore | Feb. 21, 1939 |
| 2,198,113 | Holmes | Apr. 23, 1940 |
| 2,252,699 | Byrne | Aug. 19, 1941 |
| 2,408,773 | Goodall | Oct. 8, 1946 |

FOREIGN PATENTS

| Number | Country | Date |
|---|---|---|
| 546,000 | Germany | Mar. 8, 1932 |